US011985750B2

(12) United States Patent
Tolle et al.

(10) Patent No.: US 11,985,750 B2
(45) Date of Patent: May 14, 2024

(54) OPERATION-CONTROL NODE FOR CONTROLLING LIGHTING DEVICES

(71) Applicant: SIGNIFY HOLDING B.V., Eindhoven (NL)

(72) Inventors: Tobias Georg Tolle, Beerse (BE); Leendert Teunis Rozendaal, Valkenswaard (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 126 days.

(21) Appl. No.: 17/790,732

(22) PCT Filed: Dec. 22, 2020

(86) PCT No.: PCT/EP2020/087633
§ 371 (c)(1),
(2) Date: Jul. 3, 2022

(87) PCT Pub. No.: WO2021/140029
PCT Pub. Date: Jul. 15, 2021

(65) Prior Publication Data
US 2023/0007758 A1   Jan. 5, 2023

(30) Foreign Application Priority Data
Jan. 6, 2020   (EP) .................................... 20150324

(51) Int. Cl.
*H05B 47/19*   (2020.01)
*H05B 47/155*   (2020.01)
(52) U.S. Cl.
CPC .......... *H05B 47/19* (2020.01); *H05B 47/155* (2020.01)

(58) Field of Classification Search
None
See application file for complete search history.

(56) References Cited

U.S. PATENT DOCUMENTS

| 8,023,482 B2 | 9/2011 | Gong et al. |
| 9,288,066 B2 | 3/2016 | Hui et al. |
| 9,635,743 B2 | 4/2017 | Magielse et al. |

(Continued)

FOREIGN PATENT DOCUMENTS

WO   2019052873 A1   3/2019

*Primary Examiner* — Dedei K Hammond

(57) ABSTRACT

The invention is directed to an operation-control node (100) for controlling operation of one or more external lighting devices (101, 103) via a local-area wireless communication network. The operation-control node is configured to receive from a user-input device (105) input signals (I) indicative of respective operation-control data forming a list of settings of a control parameter values of a lighting control parameter for sequentially controlling operation of a lighting device. The operation-control node is configured to determine a setting update for updating the control parameter value and provide via the local-area wireless communication network an output message (O) comprising the setting update only while an output-control information that depends on an ascertained network-capacity information indicative of an expected network capacity available for transmitting messages within the local-area wireless communication network indicates so, thus reducing the risk of exceeding the network capacity when controlling operation of the lighting devices.

14 Claims, 6 Drawing Sheets

(56) References Cited

U.S. PATENT DOCUMENTS

2013/0285572 A1   10/2013  Saes
2016/0302290 A1*  10/2016  Magielse ............... H05B 47/16
2017/0208672 A1*  7/2017  Goergen ............ H04L 12/2832

* cited by examiner

OPERATION-CONTROL NODE FOR CONTROLLING LIGHTING DEVICES

CROSS-REFERENCE TO PRIOR APPLICATIONS

This application is the U.S. National Phase application under 35 U.S.C. § 371 of International Application No. PCT/PCT/EP2020/087633, filed on Dec. 22, 2020, which claims the benefit of European Patent Application No. 20150324.0, filed on Jan. 6, 2020. These applications are hereby incorporated by reference herein.

FIELD OF THE INVENTION

The present invention is directed to an operation-control node for controlling operation of one or more external lighting devices via a local-area wireless communication network, to a local-area wireless communication arrangement, to a method for operating an operation-control node in controlling operation of one or more lighting devices via a local-area wireless communication network, to a method for controlling operation of lighting devices via a local-area wireless communication network, and to a computer program.

BACKGROUND OF THE INVENTION

U.S. Pat. No. 9,635,743 B2 describes an operation-control node for controlling a lighting device via a network. The controller comprises a receiver arranged for receiving a first sequence of light settings distributed over a first plurality of points in time, and defining a dynamic light effect. According to U.S. Pat. No. 9,635,743 B2, a dynamic light effect is a change over time of a plurality of light settings which is applied to a set of lighting devices. The controller further comprises a processor arranged for converting the first sequence of light settings into a second sequence of light settings distributed over a second plurality of points in time. The controller further comprises a transmitter arranged for transmitting light settings to the lighting device. The processor of the controller is further arranged for receiving an indication of a network capacity of the network, and the processor is further arranged for converting the first sequence of light settings into the second sequence of light settings based on the indication of the network capacity.

SUMMARY OF THE INVENTION

It would be beneficial to provide an operation-control node for controlling lighting devices with a particularly low latency upon actuation of a user-input device, in accordance with a current network capacity of a local-area wireless communication network.

According to a first aspect of the present invention, an operation-control node for controlling operation of one or more external lighting devices via a local-area wireless communication network is described. The operation-control node comprises an input interface for reception of a current sequence of input signals from a user-input device. The input signals are indicative of respective current operation-control data that together represents a current sequence of settings of a control parameter value of a lighting control parameter for sequentially controlling operation of at least one lighting device of the one or more external lighting devices.

The operation control node also comprises a network-traffic ascertainment unit that is configured to ascertain network-capacity information indicative of an expected network capacity available for transmitting messages within the local-area wireless communication network.

Further, the operation-control node comprises an output-message generation unit that is connected to the input interface and the network-traffic ascertainment unit. The output-message generation unit is configured to store the received current operation-control data upon reception of a given input message. It is also configured to determine, using the ascertained network-capacity information, output-control information indicative of whether or not a control output message for updating the control parameter value of the lighting control parameter is to be generated. The output-message generation unit is also configured to determine a setting update of the control parameter value using those settings received since a last preceding provision of the control output message during a current reception of the current sequence of input messages. Further, the output-message generation unit is also configured to generate and provide to the at least one lighting device, and via the local-area wireless communication network, the control output message comprising the setting update, only while the output control information indicates so.

Therefore, the operation-control node of the first aspect is configured to provide the setting update to the at least one lighting device, the setting update being indicative of the operation control data received from the external user-input device, and the provision being dependent on the network-capacity information ascertained by the network-traffic ascertainment unit. The ascertained network capacity information is used by the output-message generation unit to generate output-control information that is in turn used to determine if a control output message comprising the setting update is to be generated and provided to the at least one lighting device.

The input signals are provided by the user-input device and directed to the input interface of the operation-control node. A plurality of input signals received at different points in time, each differing from the previous one less than a predetermined time amount forms a sequence of input signals. Each input signal is indicative of respective current operation-control data indicative of a respective setting of a control parameter value of a given lighting control parameter.

The output-message generation unit is configured to store current operation control data comprised by each of the input signals of the current sequence of input signals upon reception thereof. The output-message generation unit is further configured to generate the output-control information using the ascertained network-capacity information, which is indicative of the expected network capacity that is available for transmitting messages, including the control output messages, via the local-area wireless communication network. Then, and depending on the generated output-control information, the output-message generation unit is configured to generate and provide the control output message to the at least one lighting device.

Thus, when the ascertained network-capacity information is indicative of a sufficient expected network capacity available for transmitting messages within the local-area wireless communication network, the output-control information generated based thereon indicates that a control output message comprising the setting update is to be generated and provided. In contrast, when the ascertained network-capacity information is indicative of an insufficient expected network capacity available for transmitting messages, the output-control information generated based thereon indicates that a control output message comprising the setting update is not to be generated, and the output-message generation unit does not generate the control output message, thus avoiding an overload of the local-area wireless communication network and thus providing a way for controlling lighting devices with a particularly low latency, in accordance with a current network capacity of the local-area wireless communication network.

In the following, embodiments of the operation-control node of the first aspect of the invention will be described.

In an embodiment, the user-input device is an external device with respect to the operation-control node. For use with such an external user-input device, the operation-control node of this embodiment has a suitable interface for a detachable connection or remote wired or wireless communication with the user-input device, and for a reception of data representing a user input during operation. In some embodiments, such user-input device also provides an output to the user, for instance via a graphical user interface. In another embodiment, the user-input device is an integrated (internal) component of the operation-control node, which is typically non-detachable in normal operation, and suitably shares the same housing with the operation control-node. In such embodiments with an internal user-input device, the current sequence of input messages is provided to the operation-control node preferably via a wired connection. In another embodiment, the user-input device and the operation control node are integrated in a device with a common central processing unit, which both handles raw inputs, e.g. from a rotation sensor from which rotation events are calculated, as well as the wireless transmission. In such an embodiment, no internal wired connection is required, but some communication between two processes on the same CPU.

In an embodiment, wherein the user-input device is an external user-input device wirelessly connected to the operation control node, the user-input device is configured to provide to the input interface the current sequence of input signals as a sequence of unicast input messages from the user-input device, the sequence of input messages comprising the respective current operation-control data.

In a particular embodiment, the output-message generation unit is configured, in response to detecting that the current sequence of settings is a sequence of absolute values of the control parameter value, to determine the setting update using the setting received last. For instance, in a particular non limiting case, wherein the current sequence of settings is a sequence of absolute values A, B, C, B, C, D, E, D, of a given control parameter value of a lighting control parameter, the output-message generation unit is configured to determine the setting update as D, D being the setting received last. Alternatively, or additionally, in another embodiment the output-message generation unit is configured, in response to detecting that the current sequence of settings is a sequence of pre-defined increments or decrements, to determine the setting update by calculating a cumulative control parameter value change using the increments or decrements received since a last preceding provision of the control output message during the current reception of the sequence of input messages. For instance, in a particular non limiting case, wherein the current sequence of settings is a sequence of pre-defined increments or decrements, i.e., +A, +A, +A, −A, +A, −A, of a given control parameter value of a lighting control parameter, the output-message generation unit is configured to determine the setting update as +2A. This is the result of calculating the cumulative control parameter value change using the increments or decrements.

In an embodiment of the operation-control node, the output-message generation unit is further configured to determine, using the ascertained network-capacity information, a message-reduction ratio indicative of a number of control output messages to be generated per number of received input messages of the current sequence, and to generate the output-control information using the message-reduction ratio.

The message-reduction ratio is, in a preferred embodiment, indicative of how many input signals or messages of the current sequence of input signals or messages have to be received before the output-control information indicates that a control output message comprising the setting update is to be generated and provided. The number of input messages or signals per control output message is inversely correlated with the expected network capacity available for transmitting messages. A high expected network capacity results in a ratio close to 1:1, which indicates that for each received input signal or message of the current sequence of input signals or messages, a respective control output message is generated and provided. Lower expected network capacities result in ratios lower than 1, such as 1:2, 1:3 etc., and closer to 0 as the expected network capacity decreases. For instance, in a situation wherein the network-traffic ascertainment unit ascertains a network-capacity information indicative of an extremely low network capacity available, the output-message generation unit may determine a message reduction ration of 1:10 or lower, meaning that one control output message is generated and provided for each 10 or more input signals or messages of the sequence. In another embodiment, the message-reduction ratio is alternatively or additionally determined in dependence on a number of user-input devices being operable in the local-area wireless communication network.

Preferably, the message-reduction ratio is determined upon reception of a first input signal or message of the current sequence of input signals or messages. Alternatively, the message-reduction ratio is determined with a predetermined determination frequency, and thus independently on whether or not the first input signal or message has been received.

In a preferred embodiment wherein the generation of the control output message depends on the message-reduction ratio, the output-message generation unit is additionally configured to detect an end of the current sequence of input signals or messages, and upon detecting the end of the current sequence of input signals or messages and upon determining subsequently that a setting update determined last has not been provided via a corresponding control output message, to generate and provide, regardless of the current output-control information, a final control output message comprising the setting update determined last.

This particular embodiment thus ensures that the setting update determined last is provided to the at least one lighting device via a final control output message, irrespective of what the output-control information indicates. Therefore, the operation of lighting device is controlled according to the setting update determined last.

In a preferred embodiment, the output-message generation unit is configured to detect an end of the sequence of input signals or messages by detecting a lapse of a predetermined waiting-time span from the time of reception of the input signal or message received last. In another embodiment, the user-input device provides a sequence-end signal that is received by the operation-control node and used to trigger the detection of the end of the sequence of input signals or messages.

In another embodiment, the output-message generation unit is additionally or alternatively configured to detect an end of the sequence of input signals or messages by detecting a change in trend of the settings received via the user-input device. For example, if the received settings so far are indicative of a wish to increase, or alternatively decrease the control parameter value and, from any given point in time, the settings are indicative of a wish to decrease, or alternatively increase the control parameter. Also, a change in a rate of incoming input signals above a predetermined threshold is interpreted by a particular embodiment as an end of the current sequence of input signals or messages.

In another embodiment, the network-traffic ascertainment unit is configured to ascertain the network-capacity information at least two times during reception of the current sequence of input signals or messages. In this particular embodiment, the output-message generation unit is configured to dynamically adapt the output-control information during reception of the current sequence of input signals or messages. In an exemplary embodiment, the ascertainment of the network capacity information is performed once upon reception a first input signal of the current sequence, and at least a second time after a predetermined time span or a predetermined number of input signals or messages has been received. In a preferred embodiment, the network capacity information is ascertained in response to detecting reception of each input signal or message of the current sequence of input signals or messages and thus enables an optimal reaction to variations in the expected network capacity.

In another embodiment of the operation-control node of the first aspect, the network-traffic ascertainment unit is configured to estimate the network capacity information using a detected number of messages transmitted within a backward time span extending from a current point in time. The number of messages transmitted also includes, in a preferred embodiment, messages transmitted by external network devices via the local-area wireless communication network. Additionally, or alternatively, the network-traffic ascertainment unit is configured to estimate the network capacity information using a number of messages being currently queued for transmission by the operation-control node via the local-area wireless communication network and a predetermined maximum network capacity.

In another embodiment, the operation-control node further comprises a topology-data storage unit configured to store local-area network topology data including a number of network nodes registered as belonging to the local-area wireless communication network. In this particular embodiment, the network traffic ascertainment unit is configured to ascertain the network capacity information using the network topology data. In an exemplary embodiment, the local-area network topology data includes information indicative of those network nodes being currently active in the local-area wireless communication network. Additionally, or alternatively, in another embodiment the local-area network topology data further comprises information indicative of an amount of activity of each network node in a predetermined time window.

In another embodiment, the operation control node additionally or alternatively includes a capability-data storage unit storing capability data indicative of a presence or absence of a capability of the operation-control node to determine the setting update by combining or skipping selected settings received since the last preceding provision of the control output message during the current reception of the current sequence of input signals. In this particular embodiment, the network traffic ascertainment unit is configured to ascertain the network capacity information additionally using the capability data. For instance, in an embodiment, the output control message comprising the setting update is provided to the at least one lighting device via a network bridge. In this embodiment, the operation control node is configured to ascertain and store the capability data pertaining to predetermined message-combination or message-skip capabilities of the network bridge and to ascertain the network capacity information using the capability data pertaining to the bridge. For instance, suitable network bridges are configured to, under predetermined circumstances, combine or skip messages such as output control messages to reduce an amount of groupcast messages that need to be sent to operate the lighting devices.

In yet another embodiment, the operation control node additionally or alternatively comprises a user-input device monitoring unit configured to determine usage data indicative of points in time within a predetermined timespan where the user-input device has provided input signals. In this embodiment, the network traffic ascertainment unit is additionally or alternatively configured to ascertain the network capacity information using the usage data.

In another embodiment, the output control message comprising the setting update is provided to the at least one lighting device via a network bridge. In this embodiment, the operation control node is configured to ascertain network bridge information pertaining to predetermined message-combination or message-skip capabilities of the network bridge and to ascertain the network capacity information using the network bridge information. For instance, suitable network bridges are configured to, under predetermined circumstances, combine or skip messages such as output control messages to reduce an amount of groupcast messages that need to be sent to operate the lighting devices.

A second aspect of the present invention is formed by a local-area wireless communication arrangement for controlling operation of one or more lighting devices via a local-area wireless communication network. The local-area wireless communication arrangement comprises an operation-control node according to the first aspect of the invention.

Additionally, the local-area wireless communication arrangement comprises at least one user-input device configured to provide the current sequence of input signals. The local-area wireless communication arrangement also comprises one or more lighting devices that include, respectively, a lighting unit configured to emit light, a receiving interface configured to receive via the local-area wireless communication network the control output messages comprising the setting update, and a control unit configured to control the emission of light by the lighting unit in accordance with the received setting update.

The local-area wireless communication arrangement of the second aspect thus shares the advantages of the operation-control node of the first aspect or of any of its embodiments.

In the following, embodiments of the local-area wireless communication arrangement of the second aspect will be described.

In a particular embodiment, the operation-control node and the user-input device share a common housing.

In an embodiment, the user-input device is configured to provide the current sequence of input signals or unicast input messages indicative of operation-control data indicative of the current sequence of settings of a light intensity, a light-emission spectrum, a color temperature or any combination thereof. Thus, the user-input device is suitable for controlling, via the operation-control node, the light intensity, the spectrum of light-emission, the color temperature or a combination thereof forming a so-called "scene", of the at least one lighting device. The operation-control data provided by the user-input device is indicative of a desired brightness or light-emission spectrum. A suitable range of control-parameter value of the light intensity extends from 0% to 100%. An exemplary range of the control parameter value of the light-emission spectrum is, in an embodiment, given by RGB component values of an RGB light source, each RGB component value ranging from 0% to 100%. An exemplary range of the control parameter value of the color temperature is, in a particular embodiment, from 2700K to 7000K. A "scene" is referred to as a particular combination of given values of at least two of the color temperature, light intensity and light-emission spectrum, typically intensity and color temperature or intensity and light-emission spectrum.

In another embodiment of the local-area wireless communication arrangement of the second aspect, the user-input device comprises a manually rotatable control element as a user-interface and the control parameter values are provided in dependence on a direction and an angular rotation amount of the control element. In another embodiment, the control parameter values are provided in further dependence on a position and an angular rotation speed of the manually rotatable control element.

Alternatively, in another embodiment the user input device comprises a slideable control element as a user-interface and the control parameters values are provided in dependence on a direction and a linear displacement amount of the slideable control element with respect to a reference position. In another embodiment, the control parameter values are provided in further dependence on a position and a linear displacement speed of the slideable control element.

Alternatively, in yet another embodiment, the user-input device comprises a pressable control element and the settings of the control parameter value to be provided depend on a number of press-events or on a press-event rate of the pressable control element.

Thus, rotating the rotatable control element by a predetermined angular rotation amount or sliding the slideable control element by a predetermined linear displacement amount, or pressing the pressable control element a predetermined number of times or with a given rate generates a predetermined amount of input signals or unicast input messages directed to the operation control node.

The rotatable control element is in some embodiments an endless-rotation control element, and, in alternative embodiments, a rotatable control element with fixed rotation limits. In the case of an endless-rotation control element, a rotation in a given first rotational direction of the predetermined angular rotation amount generates an input signal indicative operation-control data which is indicative of a desire to increase the control parameter value by a pre-defined increase. Conversely, rotating the endless-rotation control element in a given second rotational direction different from the first direction causes generation of an input signal indicative of operation-control data indicative of a desire to decrease the control parameter value by a pre-defined decrease. For instance, if the light intensity of a lighting device is currently 55%, and the user turns the endless rotation control element clockwise by the predetermined angular rotation amount, the operation control data provided with the corresponding input signal indicates that the light intensity of the light emitted by the lighting device should increase by, for example, 2% absolute, i.e. to 57%. Turning the endless rotation control element anti-clockwise the predetermined angular rotation amount will cause the light intensity to decrease by 2% absolute. The increase and decrease of 2% is merely an example and any other predefined increases or decreases are also suitable.

In the case of a rotatable control element with fixed rotation limits or of a slideable control element both of which enable only a limited rotation or displacement, each of the two limits is associated with one of the two end values of an overall control-parameter range, and the intermediate positions correspond to values of the control-parameter range. Typically, the values are mapped to the positions using a linear mapping.

In a preferred embodiment, the local-area wireless communication network is a low-rate wireless personal area network (LR-WPAN) in accordance with the IEEE 802.15.4 standard, preferably Zigbee. In a preferred embodiment having more than one user-input device, each of the user-input devices is configured to control a preferably non-overlapping subset of the lighting devices. The information regarding which lighting device is controlled by which user-input device is preferably stored in the operation-control node. The input signal or the unicast input messages are directed only to the operation-control node, which then outputs, in dependence on the ascertained network-capacity information, the control output message to the corresponding lighting devices, which are typically provided by the operation-control node as groupcast or multicast control output messages directed to the lighting devices currently associated to the user-input device.

According to a third aspect of the present invention, a method for operating an operation-control node for controlling operation of one or more lighting devices via a local-area wireless communication network is described. The method comprises:

receiving a current a sequence of input signals from at least one given user-input device, the current sequence of input signals being indicative of respective current operation-control data that together forms a current sequence of settings of a control parameter value of a lighting control parameter for sequentially controlling operation of at least one of the one or more external lighting devices;

storing the received respective current operation-control data upon reception of a given input message;

ascertaining network-capacity information indicative of an expected network capacity available for transmitting messages within the local-area wireless communication network;

determining, using the ascertained network-capacity information, output-control information indicative of whether or not a control output message for updating the control parameter value of the lighting control parameter is to be generated;

determining a setting update of the control parameter value using those settings received since a last preceding provision of the control output message during the current reception of the current sequence of input signals; and generating and providing to the at least one lighting device via the local-area wireless communication network the control output message comprising the setting update, only while the output control information indicates so.

The method of the third aspect thus shares the advantages of the operation-control node of the first aspect of the invention.

In the following, embodiments of the method of the third aspect will be described.

In an embodiment, the method further comprises:

determining, using the ascertained network-capacity information, a message-reduction ratio indicative of a ratio between a number of received input signals of the current sequence of input signals and a number of control output messages to be generated and provided; and generating the output-control information using the message-reduction ratio.

In another embodiment, the method further comprises:

upon detecting an end of the current sequence of input signals and upon detecting subsequently that a setting update determined last has not been provided via a corresponding control output message, generating and providing a final control output message comprising the setting update determined last, regardless of the current output-control information.

According to a fourth aspect of the present invention a method for controlling operation of lighting devices via a local-area wireless communication network is presented. The method comprises:

providing a current sequence of input signals indicative of respective current operation-control data that together forms a current sequence of settings of a control parameter value of a lighting control parameter for controlling operation of at least one lighting device;

carrying out the method of the third aspect;

receiving via the local-area wireless communication network the control output messages comprising the setting update;

controlling emission of light from a lighting unit of at least one lighting device in accordance with the received setting update.

Thus, the method of the fourth aspect shares the advantages of the method of the third aspect or of any of its embodiments.

According to a fifth aspect a computer program is presented. The computer program comprises instructions which, when the program is executed by a computer, cause the computer to carry out the method of the third aspect or of the fourth aspect or of any of their respective embodiments.

It shall be understood that the operation-control node of claim 1, the local-area wireless communication arrangement of claim 9, the method for operating an operation-control node of claim 11, the method for controlling operation of lighting devices via a local-area wireless communication network of claim 14, and the computer program of claim 15, have similar and/or identical preferred embodiments, in particular, as defined in the dependent claims.

It shall be understood that a preferred embodiment of the present invention can also be any combination of the dependent claims or above embodiments with the respective independent claim.

These and other aspects of the invention will be apparent from and elucidated with reference to the embodiments described hereinafter.

DETAILED DESCRIPTION OF EMBODIMENTS

Figure 1:
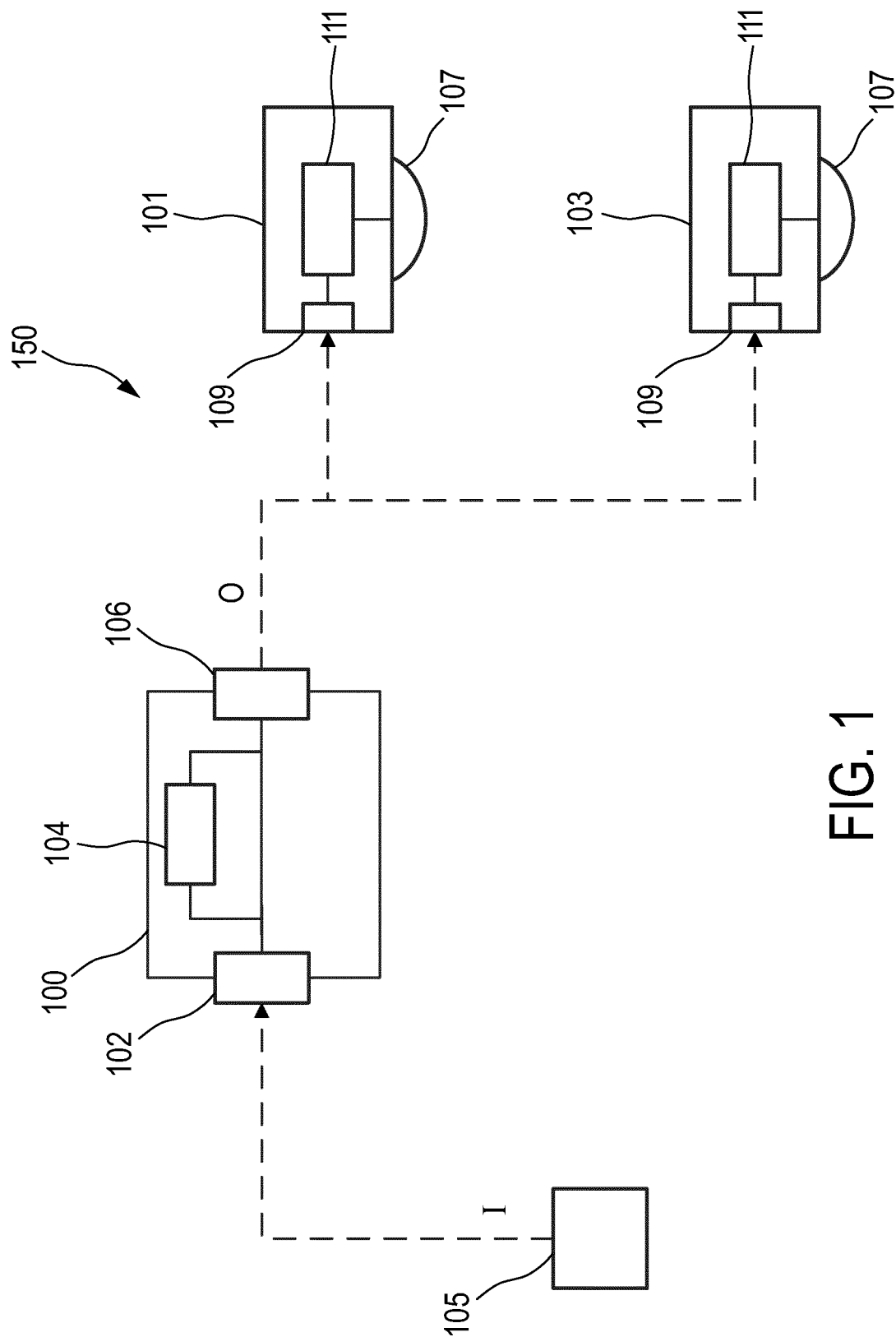
FIG. 1 shows a schematic block diagram of an exemplary embodiment of a local-area wireless communication arrangement comprising an operation-control node, one user-input device and two lighting devices.

FIG. 1 shows a schematic block diagram of an exemplary embodiment of a local-area wireless communication arrangement 150 comprising an operation-control node 100, one user-input device 105 and two lighting devices 101, 103. The local-area wireless communication arrangement 150 is therefore configured to controlling operation one or more of the lighting devices 101, 103 via a local-area wireless communication network. In this particular example, the local-area wireless communication network is a low-rate wireless personal area network in accordance with the IEEE 802.15.4 standard. Other exemplary local-area wireless arrangements use alternative wireless communication protocols known to the person skilled in the art.

The user-input device 105 is in this particular example, a stand-alone device that is configured to provide, via the local-area wireless communication network, a current sequence of unicast input messages I from to the operation-control node 100. In an alternative local-area wireless communication arrangement (not shown), the user input device shares a common housing with the operation-control node, and the current sequence of input signals is preferably provided via a wired connection.

The input messages I comprise respective operation-control data that together forms a current sequence of settings of a control parameter value of a lighting control parameter for controlling operation of at least one lighting device of the one or more external lighting devices. Examples of lighting control parameters include, but are not limited to, a light intensity, a light-emission spectrum and a color temperature. Different alternatives of exemplary user-input devices will be discussed below with reference to FIG. 3.

The local-area wireless communication arrangement 150 also includes the operation-control node 100. The operation-control node 100 comprises an input interface 102 for reception of the current sequence of unicast input messages I provided by the user-input device 105. In an alternative operation-control node (not shown), the user input-device is included in the operation-control node and the user input device is electrically connected to the input interface. In this alternative operation control node, the user-input device is configured to provide one or more input signals indicative of the respective operation-control data.

The local-area wireless communication arrangement 100 also comprises a network-traffic ascertainment unit 104 which is in this particular example connected to the input interface 102 and configured to ascertain network-capacity information indicative of an expected network capacity available for transmitting messages within the local-area wireless communication network. Further, the operation-control node 100 comprises an output-message generation unit 106 that is connected to the input interface and the network-traffic ascertainment unit and which is configured to store the received respective operation-control data upon reception of a given input message, to determine, using the ascertained network-capacity information, output-control information indicative of whether or not a control output message for updating the control parameter value of the lighting control parameter is to be generated, to determine a setting update of the control parameter value using the settings received since a last preceding provision of the control output message during the reception of the current sequence of input messages, and to generate and provide to the at least one lighting device via the local-area wireless communication network a control output message O comprising the setting update, only while the output-control information indicates so.

The local-area wireless communication arrangement also includes the lighting devices 103 and 105, which respectively comprise a lighting unit 107 configured to emit light, a receiving interface 109 configured to receive via the local-area wireless communication network the control output messages comprising the setting update, and a control unit 111 that is connected to the receiving interface and to the lighting unit and configured to control the emission of light by the lighting unit in accordance with the received setting update.

The network-capacity information that is indicative of the expected network capacity available for transmitting messages within the local-area wireless communication network, including the control output messages O and any other relevant messages sent on the same local-area wireless communication network, is ascertained differently in different exemplary operation-control nodes.

For example, in a particular operation-control node, the network-capacity information is ascertained or determined at predetermined points in time, defined by a predetermine ascertainment frequency. In alternative operation-control nodes, the network-capacity information is determined in response to detecting reception of an input message, or predetermined number of input messages of the current sequence of input messages. In another alternative operation control node, the network-capacity information is ascertained both at the predetermined points in time and in response to receiving a message, in particular an input message I.

For instance, the network-capacity information is preferably determined at least upon reception of a first input message of the current sequence, and more preferably, and in order to ensure a better adaptation to possible time variations of the network-capacity available, upon reception of each input message. The network-capacity information is determined in an exemplary operation-control node after reception of a predetermined number of input messages belonging to the same current sequence. For example, a network-traffic ascertainment unit of a particular operation-control node is configured to ascertain the network-capacity information at least two times during reception of the current sequence. The output-message generation unit is thus advantageously configured to dynamically adapt the output-control information during reception of the current sequence.

Figure 2:
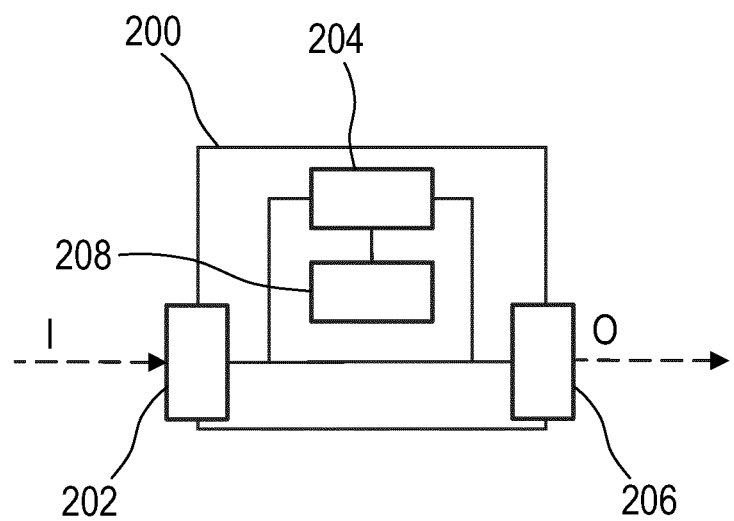
FIG. 2 shows a schematic block diagram of an exemplary embodiment of an operation-control node.

FIG. 2 shows a schematic block diagram of an exemplary embodiment of an operation-control node 200. The following discussion will focus on those features that differentiate the operation-control node 100 of FIG. 1 from the operation-control node 200 of FIG. 2. The technical features that fulfil an identical function in a similar way are referred to using the same numerals, except for the first digit, which is "1" for the operation-control node 100 of FIG. 1 and "2" for the operation-control node 200 of FIG. 2.

The operation-control node 200 further comprises a topology-data storage unit 208 that is configured to store local-area network topology data including a number of network nodes registered as belonging to the local-area wireless communication network. The network traffic ascertainment unit is configured to ascertain the network capacity information using the network topology data. Thus, the local-area network topology data is indicative of a number of nodes that are registered, irrespectively of whether they are currently active or not, e.g. if they are being powered and are operative for transmitting messages and thus for potentially using the available network capacity or not. The more nodes that are included, the higher the risk that the available network capacity is not sufficient for conveying messages, in a worst-case scenario where all or a high number of nodes transmit messages at the same time. The output-message generation unit can therefore generate the output-control information indicative of whether or not a control output message comprising the operation-control data of the input message received last is to be generated in dependence on the number of nodes registered. For example, when there is a large number of nodes registered and therefore a high risk of overloading the wireless communication network, the output-control information may be generated so as to skip a predetermined number of input messages, i.e., to not transmit the operation control data of those input messages via a control output message.

In a preferred operation-control node, the local-area network topology data includes information indicative of those network nodes being currently active in the local-area wireless communication network, i.e., those being powered and operative for transmitting messages and thus for potentially using the available network capacity. Additionally, or alternatively, in another embodiment the local-area network topology data further comprises information indicative of an amount of activity of each network node in a predetermined time window.

Alternatively, in another operation-control node, the network-traffic ascertainment unit is configured to estimate the network capacity information using a number of messages transmitted within a backward time span extending from a current point in time or a number of messages being currently queued for transmission by the operation-control node via the local-area wireless communication network and a predetermined maximum network capacity. The number of transmitted messages includes, in an exemplary operation-control node, messages transmitted by external network nodes that use the same local-area wireless communication network. Thus, the operation-control node derives the network-capacity information using available information pertaining to the control output messages recently sent, i.e., sent within the backward time span extending from the current point in time, or those that are queued for transmission or both.

Figure 3:
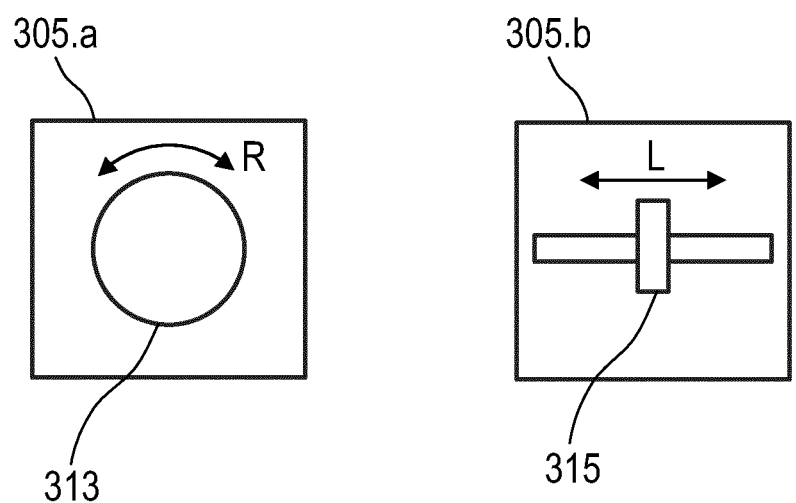
FIG. 3 shows two schematic diagrams representing respective embodiments of a user-input device.

FIG. 3 shows two schematic diagrams representing two different user-input devices 305.a and 305.b. that are suitable for use in the local-area wireless communication arrangement 150 of FIG. 1. The user-input device 305.a comprises a rotatable control element 313. The control parameter values to be provided as operation-control data depends on a direction and an angular rotation amount R of the rotatable-interface. The rotatable control element is in a particular user-input device an endless rotatable control element. A rotation in a given direction is associated with an increase of the control parameter value and a rotation in an opposite direction is associated with a decrease of the control parameter value. The angular rotation amount R in indicative of a magnitude of the increase or decrease of the control parameter value. For instance, turning the endless rotatable control element one degree in a clockwise direction results, in a given exemplarily local area communication arrangement, in a change of magnitude of 1% absolute, i.e., in a pre-defined increase of 1%. This example is not limited and other values of angle and changes in magnitude are also implemented in different user-input devices.

Alternatively, the rotatable control element is configured to be rotated only in a predetermined angle range. In this particular case, a first end of the angle range is associated with a first end of the control-parameter range and the second angle range is associated with a second end of the control parameter range. Values belonging to the control-parameter ranged are mapped to positions of the rotatable control element belonging to the angle range. This way of operation is similar in the case of the user input device 305.b, which comprises a slideable control element 315 and wherein the control parameters values to be provided depend on a direction and a linear displacement amount L of the slideable control element. Since the linear displacement amount is limited and has two ends, each of those two ends is associated with a respective end of the control-parameter range.

Figure 4A:
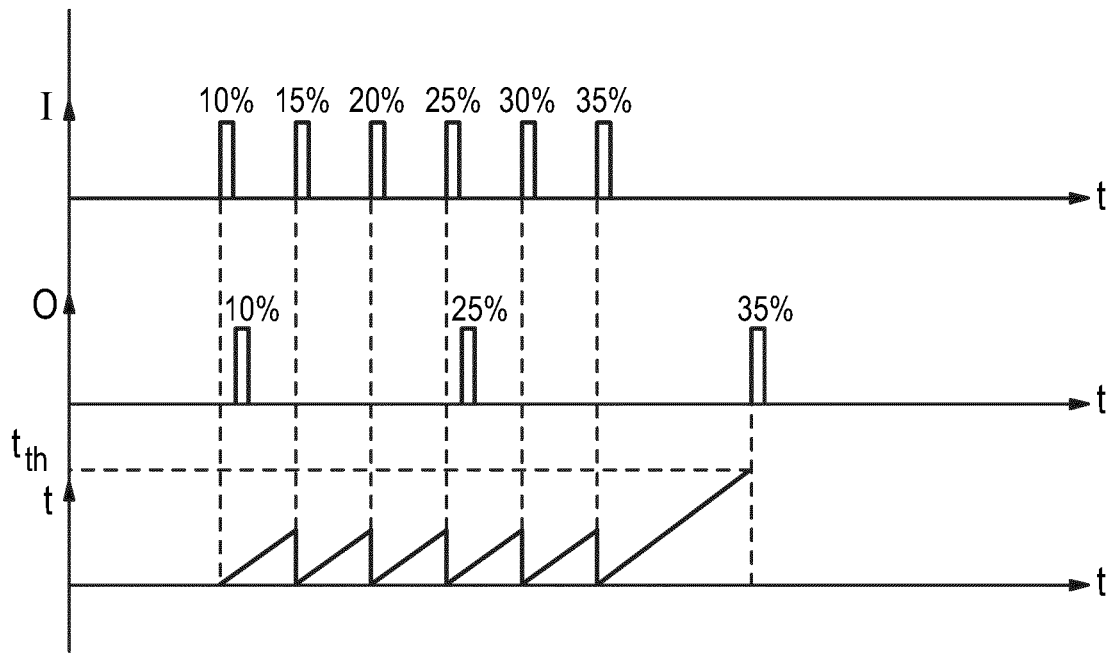
FIGS. 4a and 4b show time graphs showing the operation of a particular embodiment of an operation-control node in dependence on the input signals.
Figure 4B:
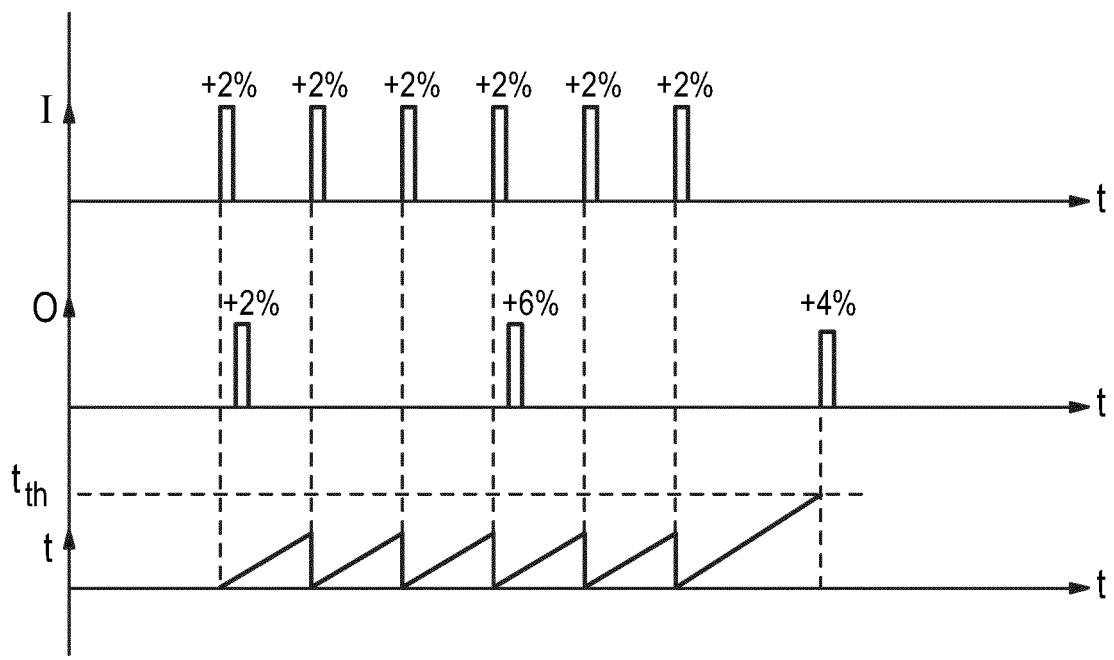

FIGS. 4a and 4b show time graphs showing the operation of a particular embodiment of an operation-control node.

I(t) represents the incoming unicast input messages provided by a user-input device, which is exemplarily and for the sake of clarity a dimmer for reducing or increasing an intensity amount of the light emitted by the lighting unit of the lighting device. Thus, the intensity amount is the control parameter value associated to the operation of the user-input device. A user operates the user-input device by rotating or sliding a control element a certain angular rotation amount or a certain linear displacement amount. In FIG. 4a, said amount is associated to a given control-parameter interval of the overall control parameter range. For instance, the overall control parameter range of the light intensity amount is 0%-100% and the control-parameter interval associated to the current sequence of settings provided by operation of the user-input device is 10%-35%. During operation of the control element, the user-input device sequentially provides six unicast input messages to the operation-control node, each indicative of a respective control parameter value and forming a current sequence of settings of a control parameter value consisting of 10%, 15%, 20%, 25% 30% and 35%. The granularity of these values mainly depend on how the user-input device is implemented, and other intervals rather than 5% are also applicable.

An operation-control node receives the current sequence of unicast input messages. In this exemplary operation-control node, the output-message generation unit is further configured to determine, using the ascertained network-capacity information, a message-reduction ratio indicative of a number of control output messages to be generated per number of received input messages of the current sequence and to generate the output-control information using the message-reduction ratio. For example, in a particular case, and based on the ascertained network-capacity information, a message-reduction ratio of 1:3 is determined. This means that a control output message is generated and provided for every three input messages received.

O(t) thus represents the generation and provision of control output messages O with time for a message-reduction ratio of 1:3. The operation-control data of the first message, indicative of a control parameter value of 10%, is provided as a setting update via a control output message to the lighting device or devices to be controlled. However, the operation-control data, i.e. the settings, of the second and third input messages, indicative of control parameter values of 15% and 20% are not provided because the output-control information, that is based on the 1:3 message reduction ratio does not indicate so. Once the fourth input message is received, indicating a desired light intensity amount of 25%, the output-control information indicates that a control output messages comprising the setting received last, i.e., 25%, is to be generated and provided to the corresponding lighting device.

The ascertainment of the network-capacity information can be for instance performed once, when the first input message is received or dynamically, i.e., two or more times during reception of the current sequence of input messages, preferably upon receiving each input message.

According to the discussion of FIG. 4 so far, the settings of the control parameter value corresponding to 30% and 35% are not forwarded to the lighting devices, because the output-control information was indicative of a no generation and no provision of a corresponding control output message, according to the 1:3 ratio. The user, however, may experience this as a failure to control the lighting device, since he or she operated the user-input device to control the lighting intensity amount up to a value of 35% and not 25%. The exemplary operation-control node is suitably configured to detect an end of the current sequence of input messages. This particular operation-control node monitors a waiting-time amount lapsed since reception of the input message last received and, determined an end of the current sequence of input messages when the waiting-time amount exceeds a predetermined time threshold $t_{th}$. In other exemplary operation-control node, the output-message generation unit is configured to receive an end-of-sequence signal, for example from the user-input device. The end-of sequence signal may require a predetermined user-input, such as pressing a button, or may be based on signal from a pressure or temperature sensor at the user-input device configured to detect when the user has ceased operation of the user-input device.

In the example of FIG. 4a, upon determining that the current sequence has ended and subsequently that a setting update determined last has not been provided via a corresponding control output message, the output-message generation unit is configured to generate and provide a final control output message comprising the operation-control data of the last input message of the current sequence, 35%, as the setting update. This ensures an outstanding quality of service when controlling operation of the lighting devices.

Analogously, FIG. 4b exemplifies a case wherein the sequence of settings of a control parameter value of a lighting control parameter is a sequence of pre-defined increments or decrements, in this particular example, increments of 2%. As in the example described with reference to FIG. 4a, and based on a given ascertained network-capacity information, a message-reduction ratio of 1:3 is determined. This means that a control output message is generated and provided for every three input messages received.

The operation-control data of the first message, indicative of an increase of 2% of the control parameter value, is provided as a setting update via a control output message to the lighting device or devices to be controlled. However, the operation-control data, i.e. the settings, of the second and third input messages, indicative of further increases of 2% absolute are not provided because the output-control information, that is based on the 1:3 message reduction ratio does not indicate so. Once the fourth input message is received, indicating a desired further increase of 2%, the output-control information indicates that a control output messages is to be generated and provided to the corresponding lighting device.

In this case, the setting update is determined by calculating a cumulative control parameter value change using the increments or decrements received since a last preceding provision of the control output message during the current, i.e., ongoing reception of the current sequence of input messages. As a result, a setting update indicative of a cumulative increase of 6% is provided via a corresponding control output message.

Also, as in the example described in FIG. 4a, upon determining that the current sequence has ended and subsequently that a setting update determined last, in this case a cumulative +4% absolute, has not been provided via a corresponding control output message, the output-message generation unit is configured to generate and provide a final control output message comprising the operation-control data of the last input message of the current sequence as the setting update.

Figure 5:
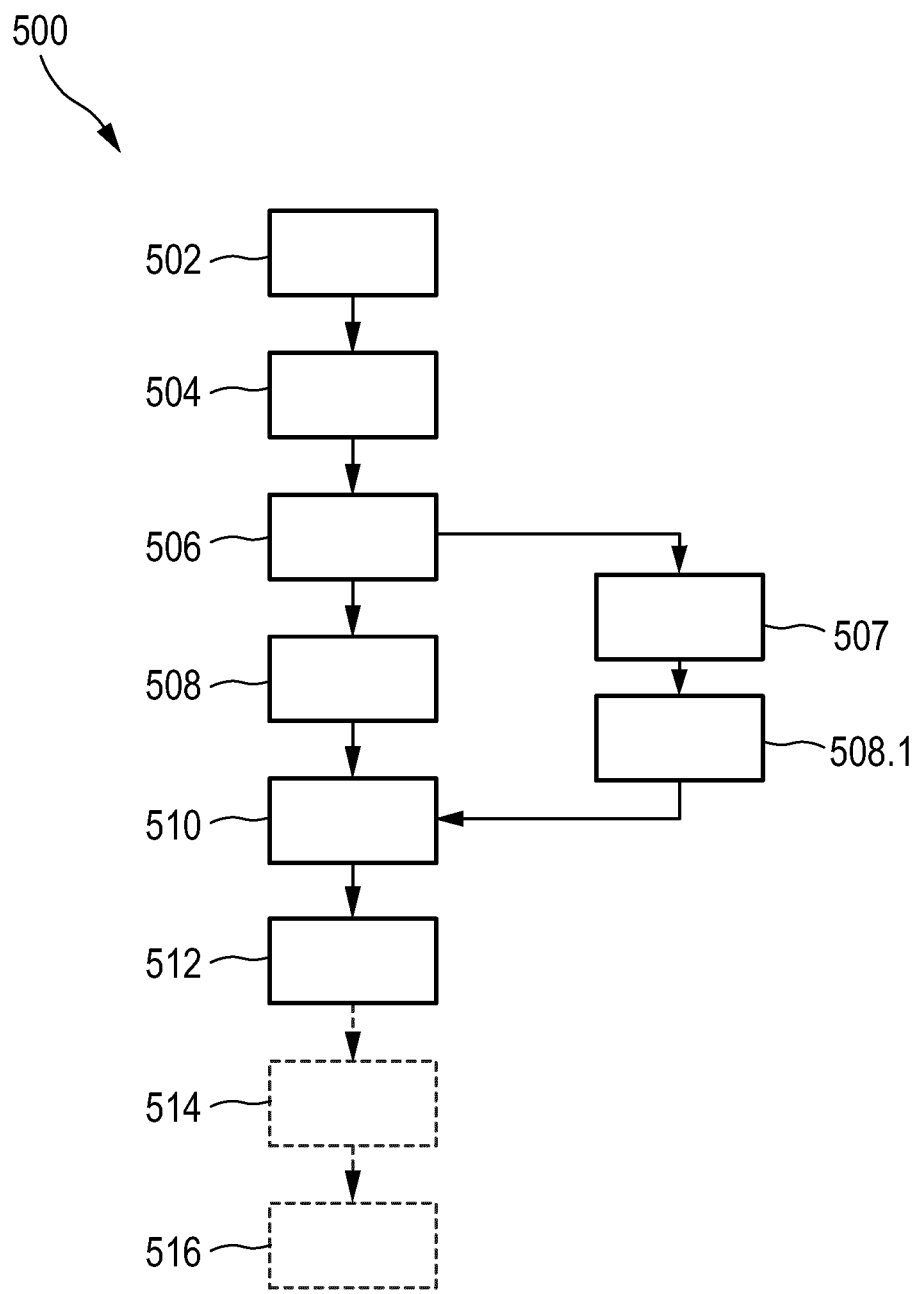
FIG. 5 shows a flow diagram of a particular embodiment of a method for operating an operation-control node for controlling operation of one or more lighting devices via a local-area wireless communication network.

FIG. 5 shows a flow diagram of an exemplary method 500 for operating an operation-control node for controlling operation of one or more lighting devices via a local-area wireless communication network. The method comprises, in a step 502, receiving a current sequence of unicast input messages from at least one given external user-input device, the sequence of input messages comprising respective current operation-control data that together forms a current sequence of settings of a control parameter value of a lighting control parameter for controlling operation of at least one of the one or more external lighting devices. The method comprises, in a step 504, storing the received respective operation-control data upon reception of a given input message. The method also comprises, in a step 506, ascertaining network-capacity information indicative of an expected network capacity available for transmitting messages within the local-area wireless communication network. The method also comprises, in a step 508, determining, using the ascertained network-capacity information, output-control information indicative of whether or not a control output message for updating the control parameter value of the lighting control parameter is to be generated, and, in a step 510, determining a setting update of the control parameter value using the settings received since a last preceding provision of the control output message during the reception of the current sequence of input messages. The method also comprises, in a step 512 generating and providing to the at least one lighting device via the local-area wireless communication network the control output message comprising the setting update, only while the output control information indicates so.

A particular implementation of the method 500 also comprise determining, in a step 507, and using the ascertained network-capacity information, a message-reduction ratio indicative of a ratio between a number of received input messages of the current sequence and a number of control output messages to be generated and provided. This exemplary method includes, in a step 508.1 analogous to step 508 described above, generating the output-control information using the message-reduction ratio.

Another particular implementation of the method, indicated by the method steps shown with a dashed line and based on the discussion of FIG. 4 above, comprises, in a step 514, detecting an end of the current sequence of input messages and detecting subsequently that a setting update determined last has not been provided via a corresponding control output message. The method also comprises, in a step 516, and upon detecting the end of the current sequence and determining that a setting update determined last has not been provided, generating and providing a final control output message comprising the setting update determined last.

Figure 6:
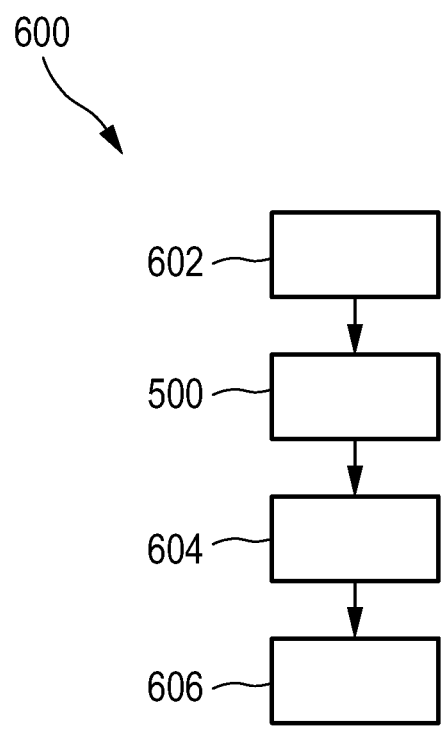
FIG. 6 shows a flow diagram of a particular embodiment of a method for controlling operation of lighting devices via a local-area wireless communication network.

FIG. 6 shows a flow diagram of a method 600 for controlling operation of lighting devices via a local-area wireless communication network. The method comprises, in a step 602, providing a current sequence of input messages comprising respective operation-control data that together forms a current sequence of settings of a control parameter value of a lighting control parameter for controlling operation of at least one lighting device. The method also comprises carrying out the method 500 of FIG. 5. The method also comprises, in a step 604, receiving via the local-area wireless communication network the output messages comprising the comprising setting update and, in a step 606, controlling emission of light from a lighting unit of at least one lighting device in accordance with the received setting update.

In summary, the invention is directed to an operation-control node for controlling operation of one or more external lighting devices via a local-area wireless communication network. The operation-control node is configured to receive from a user-input device unicast input messages comprising respective operation-control data forming a current sequence of settings of a control parameter values of a lighting control parameter for controlling operation of at least one lighting device. The operation-control node is configured to determine a setting update for updating the control parameter value and provide via the local-area wireless communication network an output message comprising the setting update only while an output-control information that depends on an ascertained network-capacity information indicative of an expected network capacity available for transmitting messages within the local-area wireless communication network indicates so, thus ensuring an acceptable latency when controlling operation of the lighting devices.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage.

A computer program may be stored/distributed on a suitable medium, such as an optical storage medium or a solid-state medium, supplied together with or as part of other hardware, but may also be distributed in other forms, such as via the Internet or other wired or wireless telecommunication systems.

Any reference signs in the claims should not be construed as limiting the scope.

The invention claimed is:

1. An operation-control node for controlling operation of one or more external lighting devices via a local-area wireless communication network, the operation-control node comprising:
   an input interface for reception of a current sequence of input signals from a user-input device, the input signals being indicative of respective current operation-control data that together represents a current sequence of settings of a control parameter value of a lighting control parameter for sequentially controlling operation of at least one lighting device of the one or more external lighting devices;
   a network-traffic ascertainment unit configured to ascertain network-capacity information indicative of an expected network capacity available for transmitting messages within the local-area wireless communication network; and
   an output-message generation unit, connected to the input interface and the network-traffic ascertainment unit, configured to:
      store the received respective current operation-control data upon reception of a given input signal;
      determine, using the ascertained network-capacity information, output-control information indicative of whether or not a control output message for updating the control parameter value of the lighting control parameter is to be generated; and
      on the condition that the output-control information indicates that a control output message comprising the setting update is not to be generated, not generate such control output message; or else
      on the condition that the output-control information indicates that a control output message comprising the setting update is to be generated, generate and provide to the at least one lighting device such control output message via the local-area wireless communication network, wherein the control output message comprises a setting update of the control parameter value which the output-message generation unit is configured to determine using those settings received since a last preceding provision of the control output message during a current reception of the current sequence of input signals by:
      using the setting received last, in response to detecting that the current sequence of settings is a sequence of absolute values of the control parameter value; or else
      calculating a cumulative control parameter value change using the increments or decrements received since a last preceding provision of the control output message during the current reception of the current sequence of input signals, in response to detecting that the current sequence of settings is a sequence of pre-defined increments or decrements.

2. The operation-control node of claim 1, wherein the input interface is configured to receive the current sequence of input signals as unicast input messages from the at least one user-input device, the unicast input messages comprising the respective operation-control data.

3. The operation-control node of claim 1, wherein the output-message generation unit is further configured:
   to determine, using the ascertained network-capacity information, a message-reduction ratio indicative of a number of control output messages to be generated per number of received input signals of the current sequence; and
   to generate the output-control information using the message-reduction ratio.

4. The operation-control node of claim 3, wherein the output-message generation unit is further configured:
   upon detecting an end of the current sequence of input signals and upon detecting subsequently that a setting update determined last has not been provided via a corresponding control output message, to generate and provide, regardless of the current output-control information, a final control output message comprising the setting update determined last.

5. The operation-control node of claim 1, wherein—the network-traffic ascertainment unit is configured to ascertain the network-capacity information at least two times during reception of the current sequence of input signals; and
   wherein the output-message generation unit is configured to dynamically adapt the output-control information during the reception of the current sequence of input signals.

6. The operation-control node of claim 1, wherein the network-traffic ascertainment unit is configured:
   to estimate the network capacity information using a number of messages transmitted within a backward time span extending from a current point in time or a number of messages being currently queued for transmission by the operation-control node via the local-area wireless communication network and a predetermined maximum network capacity.

7. The operation-control node of claim 1, further comprising:
   a topology-data storage unit configured to store local-area network topology data including a number of network nodes registered as belonging to the local-area wireless communication network; or
   a capability-data storage unit storing capability data indicative of a presence or absence of a capability of the operation-control node to determine the setting update by combining or skipping selected settings received since the last preceding provision of the control output message during the current reception of the current sequence of input signals; or
   a user-input monitoring unit configured to determine usage data indicative of a fraction of a predetermined recent timespan that the user-input device has required for providing the input signals; and
   wherein the network traffic ascertainment unit is configured to ascertain the network capacity information additionally using the network topology data or the capability data or the usage data.

8. A local-area wireless communication arrangement for controlling operation of one or more lighting devices via a local-area wireless communication network, comprising:
   an operation-control node according to claim 1;
   at least one user-input device configured to provide the current sequence of input signals;
   one or more lighting devices, comprising:
   a lighting unit configured to emit light;
   a receiving interface configured to receive via the local-area wireless communication network the control output messages comprising the setting update; and
   a control unit connected to the receiving interface and to the lighting unit and configured to control the emission of light by the lighting unit in accordance with the received setting update.

9. The local-area wireless communication arrangement of claim 8, wherein—the user-input device comprises a rotatable control element, and the settings of the control parameter value to be provided depend on a direction and an angular rotation amount of the rotatable-interface; or
- wherein the user-input device comprises a slideable control element, and the settings of the control parameter value to be provided depend on a direction and a linear displacement amount of the slideable control element; or
- wherein the user-input device comprises a pressable control element, and the settings of the control parameter value to be provided depend on a number of press-events or on a press-event rate or on a press-event duration of the pressable control element.

10. A method for operating an operation-control node in controlling operation of one or more lighting devices via a local-area wireless communication network, the method comprising:
- receiving a current sequence of input signals from a user-input device, the current sequence of input signals being indicative of respective current operation-control data that together forms a current sequence of settings of a control parameter value of a lighting control parameter for sequentially controlling operation of at least one of the one or more lighting devices;
- storing the received respective current operation-control data upon reception of a given input signal;
- ascertaining network-capacity information indicative of an expected network capacity available for transmitting messages within the local-area wireless communication network;
- determining using the ascertained network-capacity information, output-control information indicative of whether or not a control output message for updating the control parameter value of the lighting control parameter is to be generated;
- generating and providing, on the condition that the output-control information indicates that a control output message comprising the setting update is to be generated, to the at least one lighting device such control output message via the local-area wireless communication network, and else, when the output-control information indicates that a control output message comprising the setting update is not to be generated, not generating such control output message;
- wherein the control output message comprises a setting update of the control parameter value which is determined based on those settings received since a last preceding provision of the control output message during a current reception of the current sequence of input signals by:
  - using the setting received last, in response to detecting that the current sequence of settings is a sequence of absolute values of the control parameter value; or else
  - calculating a cumulative control parameter value change using the increments or decrements received since a last preceding provision of the control output message during the current reception of the current sequence of input signals, in response to detecting that the current sequence of settings is a sequence of pre-defined increments or decrements.

11. The method of claim 10, further comprising:
- determining, using the ascertained network-capacity information, a message-reduction ratio indicative of a ratio between a number of received input signals of the current sequence of input signals and a number of control output messages to be generated and provided; and
- generating the output-control information using the message-reduction ratio.

12. The method of claim 10, further comprising:
- upon detecting an end of the current sequence of input signals and upon detecting subsequently that a setting update determined last has not been provided via a corresponding control output message, generating and providing, regardless of the current output-control information, a final control output message comprising the setting update determined last.

13. A method for controlling operation of lighting devices via a local-area wireless communication network, the method comprising:
- providing a current sequence of input signals indicative of respective current operation-control data that together forms a current sequence of settings of a control parameter value of a lighting control parameter for controlling operation of at least one lighting device;
- carrying out the method of claim 10;
- receiving via the local-area wireless communication network the control output messages comprising the setting update; and
- controlling emission of light from a lighting unit of the at least one lighting device in accordance with the received setting update.

14. A non-transitory computer program comprising instructions which, when the program is executed by a computer, cause the computer to carry out the method of claim 10.

* * * * *